(12) United States Patent
Hori et al.

(10) Patent No.: US 11,064,689 B2
(45) Date of Patent: Jul. 20, 2021

(54) PEST CONTROL METHOD AND CONTROL DEVICE

(71) Applicants: Masatoshi Hori, Sendai (JP); Shin-Etsu Handotai Co., Ltd., Tokyo (JP)

(72) Inventors: Masatoshi Hori, Sendai (JP); Tomohisa Suzuki, Sendai (JP); Kazuki Shibuya, Sendai (JP); Mitsunari Sato, Sendai (JP)

(73) Assignees: Shin-Etsu Handotai Co., Ltd., Tokyo (JP); Masatoshi Hori, Sendai (JP)

( * ) Notice: Subject to any disclaimer, the term of this patent is extended or adjusted under 35 U.S.C. 154(b) by 967 days.

(21) Appl. No.: 15/039,102

(22) PCT Filed: Sep. 8, 2014

(86) PCT No.: PCT/JP2014/073679
§ 371 (c)(1),
(2) Date: May 25, 2016

(87) PCT Pub. No.: WO2015/079767
PCT Pub. Date: Jun. 4, 2015

(65) Prior Publication Data
US 2017/0156304 A1    Jun. 8, 2017

(30) Foreign Application Priority Data

Nov. 29, 2013   (JP) .............................. JP2013-248457

(51) Int. Cl.
*A01M 1/22*    (2006.01)
*A01M 1/20*    (2006.01)
(Continued)

(52) U.S. Cl.
CPC ................ *A01M 1/226* (2013.01); *F21V 9/08* (2013.01); *F21V 23/003* (2013.01); *F21V 23/04* (2013.01); *F21Y 2115/10* (2016.08)

(58) Field of Classification Search
CPC .......... A01M 1/226; A01M 1/22; A01M 1/04; A01M 29/10; A01M 1/20; A01M 17/00; A61L 2/0047; A61L 2/10
(Continued)

(56) References Cited

U.S. PATENT DOCUMENTS 2,051,057 A  *  8/1936  Pettit ........................ A01M 1/22
                                                           15/257.1
2,059,835 A  *  11/1936  Worthing .............. A01M 1/226
                                                           159/DIG. 6
(Continued)

FOREIGN PATENT DOCUMENTS

CN          101616577        12/2009
FR          2676618 A1  *  11/1992  ............ A01M 29/10
(Continued)

OTHER PUBLICATIONS

Translation of JP2008-104444.*
(Continued)

*Primary Examiner* — Darren W Ark
(74) *Attorney, Agent, or Firm* — McCarter & English, LLP

(57) ABSTRACT

The purpose of the present invention is to provide a method for controlling pests, which is effective against a variety of pests, highly safe, simple, and environmentally friendly. Provided is a pest control method for exterminating a targeted pest by the exposing the eggs, larvae or pupae of the targeted pest to visible light having a specific wavelength within a wavelength region of 400 to 500 nm at a light intensity of $7 \times 10^{17}$ photons·m$^{-2}$·s$^{-1}$ or greater.

4 Claims, 12 Drawing Sheets

(51) Int. Cl.
   *F21V 9/08*      (2018.01)
   *F21V 23/00*     (2015.01)
   *F21Y 115/10*    (2016.01)
   *F21V 23/04*     (2006.01)
(58) Field of Classification Search
   USPC .................................. 43/113, 132.1; 422/24
   See application file for complete search history.

(56) References Cited

U.S. PATENT DOCUMENTS

| | | | | |
|---|---|---|---|---|
| 2,223,813 | A * | 12/1940 | Brown | A01M 1/226 |
| | | | | 315/76 |
| 3,699,976 | A * | 10/1972 | Abe | A01M 1/226 |
| | | | | 131/299 |
| 4,337,592 | A * | 7/1982 | Hasegawa | A01M 1/226 |
| | | | | 43/107 |
| 4,556,010 | A * | 12/1985 | Persson | A01N 29/00 |
| | | | | 116/22 R |
| 5,343,652 | A * | 9/1994 | Johnson | A01M 1/02 |
| | | | | 43/132.1 |
| 5,364,645 | A * | 11/1994 | Lagunas-Solar | A23B 7/015 |
| | | | | 426/248 |
| 5,494,813 | A * | 2/1996 | Hepher | C07K 14/811 |
| | | | | 800/279 |
| 5,607,711 | A * | 3/1997 | Lagunas-Solar | A01M 1/226 |
| | | | | 426/248 |
| 5,857,282 | A * | 1/1999 | Odintsov | A01M 1/04 |
| | | | | 43/1 |
| 5,915,949 | A * | 6/1999 | Johnson | A01M 1/02 |
| | | | | 43/124 |
| 6,718,681 | B2 * | 4/2004 | Bhullar | A01M 1/226 |
| | | | | 340/557 |
| 7,452,561 | B2 * | 11/2008 | Newman | A23B 7/015 |
| | | | | 426/248 |
| 7,516,572 | B2 * | 4/2009 | Yang | A01M 1/04 |
| | | | | 43/107 |
| 8,276,313 | B2 * | 10/2012 | Reime | A01M 3/00 |
| | | | | 43/113 |
| 8,299,445 | B2 * | 10/2012 | Yamada | A01G 7/045 |
| | | | | 250/455.11 |
| 8,458,954 | B2 * | 6/2013 | Yamada | A01G 7/045 |
| | | | | 250/504 R |
| 8,506,089 | B2 * | 8/2013 | Kayser | G03B 21/28 |
| | | | | 119/713 |
| 8,790,381 | B2 * | 7/2014 | Pierce | A23L 3/0055 |
| | | | | 422/22 |
| 9,179,703 | B2 * | 11/2015 | Shur | A23L 3/003 |
| 9,374,990 | B2 * | 6/2016 | Bolen | A01M 1/02 |
| 9,648,861 | B2 * | 5/2017 | Schmitz | A01M 1/226 |
| 9,668,475 | B2 * | 6/2017 | Charles | A01M 13/003 |
| 9,844,209 | B1 * | 12/2017 | Suntych | A01K 29/005 |
| 10,245,341 | B2 * | 4/2019 | Stibich | A23L 3/28 |
| 10,251,384 | B2 * | 4/2019 | Barroso | A01M 29/10 |
| 2008/0134568 | A1 * | 6/2008 | Cowan | A01M 1/04 |
| | | | | 43/113 |
| 2010/0071257 | A1 * | 3/2010 | Tsai | A01M 1/226 |
| | | | | 43/113 |
| 2010/0090129 | A1 * | 4/2010 | Klayman | A01M 1/226 |
| | | | | 250/492.1 |
| 2010/0236497 | A1 * | 9/2010 | Philiben | A01K 11/008 |
| | | | | 119/712 |
| 2012/0121458 | A1 * | 5/2012 | Tarifi | A01M 1/023 |
| | | | | 422/24 |
| 2013/0298445 | A1 * | 11/2013 | Aoki | A01M 1/04 |
| | | | | 43/132.1 |
| 2013/0301258 | A1 * | 11/2013 | Aoki | A61L 2/084 |
| | | | | 362/231 |
| 2014/0227132 | A1 * | 8/2014 | Neister | A61L 2/0011 |
| | | | | 422/24 |
| 2014/0261151 | A1 * | 9/2014 | Ronning | A01M 29/10 |
| | | | | 116/22 A |
| 2014/0271352 | A1 * | 9/2014 | Stewart | A61L 2/10 |
| | | | | 422/24 |
| 2015/0313091 | A1 * | 11/2015 | Ara | A01G 7/045 |
| | | | | 47/58.1 LS |
| 2016/0143257 | A1 * | 5/2016 | Yanagawa | A01M 29/10 |
| | | | | 119/238 |
| 2016/0286784 | A1 * | 10/2016 | Oosthuyzen | H02G 7/00 |
| 2017/0099827 | A1 * | 4/2017 | Ronning | A01M 29/10 |
| 2017/0099828 | A1 * | 4/2017 | Ronning | A01M 29/10 |
| 2017/0164602 | A1 * | 6/2017 | Yanagawa | C02F 3/327 |
| 2017/0172135 | A1 * | 6/2017 | Yanagawa | C02F 3/327 |
| 2017/0290326 | A1 * | 10/2017 | Yanagawa | A01M 29/10 |
| 2017/0290327 | A1 * | 10/2017 | Yanagawa | A01M 29/10 |
| 2018/0009013 | A1 * | 1/2018 | Yanagawa | B08B 17/02 |
| 2018/0049421 | A1 * | 2/2018 | Hachiya | A01M 1/226 |
| 2018/0343847 | A1 * | 12/2018 | Ervin | A01M 1/226 |
| 2019/0000061 | A1 * | 1/2019 | Shimoda | A01M 1/04 |
| 2019/0208763 | A1 * | 7/2019 | Paoluccio | A01M 1/226 |
| 2020/0100491 | A1 * | 4/2020 | Winslow | A01M 1/226 |

FOREIGN PATENT DOCUMENTS

| | | | | |
|---|---|---|---|---|
| GB | 486754 | A * | 6/1938 | .......... A01M 1/2094 |
| JP | 2007209266 | A * | 8/2007 | |
| JP | 2008-1044444 | | 5/2008 | |
| JP | 2008104444 | A * | 5/2008 | .............. A01M 1/04 |
| JP | 2009022175 | A * | 2/2009 | .............. A01G 7/045 |
| JP | 2009-261267 | | 11/2009 | |
| JP | 2010-068754 | | 4/2010 | |
| JP | 2010-252671 | | 11/2010 | |
| JP | 2011-172528 | | 9/2011 | |
| JP | 2011172528 | A * | 9/2011 | |
| JP | 5435784 | B2 * | 3/2014 | |
| KR | 100575511 | B1 * | 5/2006 | ............ A01M 1/226 |
| KR | 100955404 | B1 * | 4/2010 | |
| KR | 20120083770 | A * | 7/2012 | |
| KR | 20130094609 | A * | 8/2013 | |
| KR | 101364308 | B1 * | 2/2014 | |
| RU | 2204901 | C2 * | 5/2003 | |
| WO | WO-9927970 | A2 * | 6/1999 | ............ A01M 1/226 |
| WO | WO 2007/131180 | | 11/2007 | |
| WO | 2008/050934 | | 5/2008 | |
| WO | WO-2008050934 | A1 * | 5/2008 | .............. A01M 1/04 |
| WO | WO-2010081406 | A1 * | 7/2010 | .............. A01M 1/04 |
| WO | WO-2010151362 | A1 * | 12/2010 | ............ A01M 29/10 |
| WO | WO 2012/032103 | | 3/2012 | |
| WO | WO-2014027402 | A1 * | 2/2014 | ............ A01M 29/10 |
| WO | WO-2016136742 | A1 * | 9/2016 | ............ A01M 29/10 |
| WO | WO-2017022333 | A1 * | 2/2017 | .......... A01M 17/008 |
| WO | WO-2017062771 | A1 * | 4/2017 | ............ A01M 29/10 |
| WO | WO-2017120196 | A1 * | 7/2017 | ............ A01M 29/08 |
| WO | WO-2018017982 | A1 * | 1/2018 | |

OTHER PUBLICATIONS

Translation of JP2011-172528.*
Shimoda et al., "Insect reactions to light and its applications to pest management", Applied Entomology and Zoology, Oct. 11, 2013; Available web site: https://link.springer.com/article/10.1007/s13355-013-0219-x; downloaded on Dec. 20, 2019. (Year: 2013).*
Honsberg et al., "Photon Flux", pv education.org; Available web site: https://www.pveducation.org/pvcdrom/properties-of-sunlight/photon-flux; downloaded on Dec. 20, 2019. (Year: 2019).*
Honsberg et al., "Spectral Irradiance", pv education.org; Available web site: https://www.pveducation.org/pvcdrom/properties-of-sunlight/spectral-irradiance; downloaded on Dec. 20, 2019. (Year: 2019).*
Ghanem et al., "Effect of non-ionizing radiation (UVC) on the development of Trogoderma granarium Everts", Journal of Stored Products Research, Feb. 5, 2007; Available web site: https://www.sciencedirect.com/science/article/pii/S0022474X06000841; downloaded on Dec. 20, 2019. (Year: 2007).*
Hori et al., "Lethal effect of blue light on strawberry leaf beetle, *Galerucella grisescens* (Coleoptera: Chrysomelidae)", Nature.com Scientific Reports, Jun. 2, 2017; Available web site: https://www.nature.com/articles/s41598-017-03017-z; downloaded on Dec. 20, 2019. (Year: 2017).*

(56) References Cited

OTHER PUBLICATIONS

Suzuki et al., "An LED-based UV-B irradiation system for tiny organisms: System Description and demonstration experiment . . . ", Journal of Insect Physiology, Jan. 21, 2014;Available web site:https://www.sciencedirect.com/science/article/pii/S0022191014000067; downloaded on Dec. 20, 2019. (Year: 2014).*
Hori et al., "Lethal effects of short-wavelength visible light on insects", Nature.com Scientific Reports, Dec. 9, 2014; Available web site: https://www.nature.com/articles/srep07383; downloaded on Dec. 20, 2019. (Year: 2014).*
Shibuya et al., "Toxic wavelength of blue light changes as insects grow", PLoS One, Jun. 19, 2018; Available web site: https://www.ncbi.nlm.nih.gov/pmc/articles/PMC6007831/; downloaded on Dec. 20, 2019. (Year: 2018).*
Supplementary European Search Report dated Jul. 24, 2017 based on co-pending European Patent Application No. 14866371.9—10 Pages.
Yoon, et al., Japanese Journal of Applied Entomology and Zoology, 2012, vol. 56, pp. 103-110.
Mizukami, et al., Bulletin of the Fukuoka Agricultural Research Centre, 2013, vol. 32, pp. 42-47.
International Search Report relating to co-pending International Application No. PCT/JP2014/073679, dated Nov. 25, 2014—2 Pages.
Light Radiation Conversion, Environmental Growth Chambers, (Jan. 25, 2019), http://www.egc.com/useful_info_lighting.php, 1 Page.

\* cited by examiner

PEST CONTROL METHOD AND CONTROL DEVICE

CROSS REFERENCE TO RELATED APPLICATIONS

This application is a national stage application filed under 35 USC 371 of PCT/JP2014/073679, filed Sep. 8, 2014, which claims the benefit of Japanese Patent Application No. 2013-248457, filed Nov. 29, 2013, all of which are incorporated herein, in entirety, by reference.

TECHNICAL FIELD

The present invention relates to a method for controlling a pest, and a pest control apparatus using the method.

BACKGROUND ART

Some insects do various harms to humans or livestock as pests. For example, agricultural pests bring about serious problems, such as reduction in the yields of crops and the spread of plant diseases, to the agricultural field. Also, hygiene pests have significant influence on hygiene by mediating pathogens such as viruses, bacteria, or protozoans. Thus, the efficient control of such pests is an important challenge to agriculture and/or hygiene.

Heretofore, chemical control methods based on chemical preparations have been mainly used for pest control. For example, the application of chemical pesticides to agricultural pests is a good example thereof. The pest control by the chemical control methods, however, presents major problems such as the emergence of pesticide-resistant individuals, environmental pollutions, and residues on crops. Hence, alternative control methods that are highly safe and have few impacts on the environment have been received attention in recent years.

Examples of the control techniques that substitute for the chemical control methods include biological control methods based on biological pesticides, and optical control methods using light.

The biological control methods based on biological pesticides are methods for controlling agricultural pests, etc., by use of their natural enemies as biological pesticides (natural enemy preparations) based on a prey-predator relationship or a host-parasite relationship in the native ecosystem. For example, *Amblyseius swirskii* and *Orius strigicollis* are used as biological pesticides for a difficult-to-control pest thrips. *Amblyseius swirskii*, however, is less active at low temperatures below 15° C., disadvantageously resulting in significant reduction in control effect. Also, *Orius strigicollis* exhibits an undesired low initial rate of colonization or rate of proliferation after pasture. Furthermore, the biological pesticides generally tend to cost more than the chemical pesticides.

On the other hand, the optical control methods include, for example, a method for catching and killing insects by attracting the insects to ultraviolet to blue light by use of the phototaxis of the insects. This method has been used since a long time ago as a method for controlling agricultural pests, such as light traps. Although this method is convenient and relatively inexpensive, most of attracted individuals are adults having the ability to fly. Unfortunately, the method cannot achieve fundamental control to eradicate eggs, larvae, etc.

As another optical control method, Patent Literature 1 discloses an apparatus for suppressing pigment particle migration in compound eyes by irradiating insects with long-wavelength ultraviolet to short-wavelength visible light of 380 to 500 nm. In principle, this apparatus is characterized in that the irradiation with the visible light interferes with the light and dark adaptation of insects and disrupts neurotransmission so that hormone secretion is disrupted to destroy the circadian rhythm of the insects. This kills adults and can prevent the propagation of the pests through physiological disturbance such as egg-laying disturbance, mating disturbance, or mutation disturbance. Patent Literature 1, however, describes no data demonstrating the effects of the invention. In addition, the target to be controlled by direct action is limited to adults. This approach is not effective for eggs or some larvae lacking compound eyes. The photoreceptive characteristics of compound eyes for light adaptation and dark adaptation differ largely depending on the types of the insects. In the case of, for example, nocturnal moths, light that causes light adaptation is yellow to green light of 500 to 590 nm, and purple to blue light of 380 to 500 nm is weakly effective (Non Patent Literatures 1 and 2). Thus, a problem of this approach is that a wavelength in a specific region cannot disturb various nocturnal insects. Another problem thereof is that such confusion based on light and dark adaptation is not effective for diurnal insects.

CITATION LIST

Patent Literature

Patent Literature 1: JP Patent Publication (Kokai) No. 2008-104444 A (2008)

Non Patent Literature

Non Patent Literature 1: boon et al., 2012, Japanese Journal of Applied Entomology and Zoology 56: 103-110
Non Patent Literature 2: Mizukami et al., 2013, Bulletin of the Fukuoka Agricultural Research Centre 32: 42-47

SUMMARY OF INVENTION

Technical Problem

An object of the present invention is to develop and provide a method for controlling a pest, which is effective for various pests, is highly safe and convenient, and has few environmental loads.

Solution to Problem

The present inventor has conducted diligent studies to attain the object and consequently gained a new finding that when an egg, a larva, or a pupa of the target pest is irradiated with specific short-wavelength visible light, the metamorphosis of the target pest can be inhibited to kill the insect.

In general, light having a shorter wavelength is considered to be more harmful to organisms. For example, ultraviolet light of 200 to 300 nm is used in germicidal lamps or the like. The light in this wavelength region, however, damages DNA and therefore, is disadvantageously harmful to not only germs but general organisms including humans. Furthermore, the light in this wavelength region has a germicidal effect on bacteria, viruses, yeasts, molds, algae, protozoans, parasites (including nematodes), and the like, but reportedly has almost no direct insecticidal effect on higher arthropods such as insects (Panasonic Corp., Lighting equipment, Lighting Design Support Site P.L.A.M. Lighting design documents, Lighting design/lighting system and lighting-related systems: Germicidal lamp; URL: http://www2.panasonic.biz/es/lighting/plam/knowledge/document/0320.html). For spider mites (Arachnida) belonging to the phylum Arthropoda, it is known that the hatching of their eggs or the molting of their larvae is inhibited by irradiation with riddle-wavelength ultraviolet light of 280 to 315 nm (Ohtsuka and Osakabe, 2009, Environmental Entomology 38: 920-929). Meanwhile, irradiation with long-wavelength ultraviolet light or visible light of 315 nm or more has been reported to rather have a photoreactivation effect, which repairs the damage caused by middle-wavelength ultraviolet light (Murata and Osakabe, 2013, Journal of insect Physiology 59: 24-24).

On the other hand, light in a visible light region has heretofore been thought to lack the germicidal effect or the insecticidal effect as described above. As an exception, there is only one report stating that the growth or molting of *Rotylenchulus reniformis*, a soil-inhabiting nematode belonging to the phylum Nematoda, is inhibited by irradiation with purple light having a wavelength of approximately 450 nm or less including ultraviolet light (Nakazono & Katsura, 1976, Japanese journal of nematology 6: 84-88). This report shows that visible light having a shorter wavelength has a higher inhibitory effect on growth or molting. However, there is no known report stating that organisms of the phylum Arthropoda were able to be killed by direct irradiation with light in a visible light region.

The present invention has been made on the basis of the new finding described above and provides the following:

(1) A method for controlling a pest, comprising irradiating an egg, a larva, or a pupa of the target pest with light of a specific wavelength in a wavelength region of 400 to 500 nm at a light intensity of $7\times10^{17}$ photons·m$^{-2}$·s$^{-1}$ or larger to inhibit metamorphosis thereof.

(2) The method for controlling a pest according to (1), wherein the pest is a hygiene pest, an agricultural pest, or a stored product pest.

(3) The method for controlling a pest according to (2), wherein the pest is an insect.

(4) The method for controlling a pest according to (3), wherein the pest is a species belonging to the order Diptera, the order Coleoptera, or the order Lepidoptera.

(5) A pest control apparatus configured such that a light source for pest control that emits light of a specific wavelength in a wavelength range of 400 to 500 nm is capable of irradiating an egg, a larva, or a pupa of the target pest at a light intensity of $7\times10^{17}$ photons·m$^{-2}$·s$^{-1}$ or larger.

(6) The pest control apparatus according to (5), wherein the light of a specific wavelength is arbitrarily adjustable in the wavelength range.

(7) The pest control apparatus according to (5) or (6), wherein the light source for pest control has one or more wavelength selective filters.

(8) The pest control apparatus according to any of (5) to (7), wherein the light intensity of the light source for pest control is adjustable to an arbitrary value of $7\times10^{17}$ photons·m$^{-2}$·s$^{-1}$ or larger.

(9) The pest control apparatus according to any of (5) to (8), further comprising an additional light source capable of emitting light other than the wavelength region, or light in all wavelength regions of visible light.

(10) The pest control apparatus according to (9), wherein the additional light source has a wavelength of 600 to 750 nm.

(11) A light source for pest control configured to be capable of selectively emitting short-wavelength visible light in a wavelength region of 400 to 500 nm.

The present specification encompasses the contents described in the specification and/or drawings of Japanese Patent Application No. 2013-248457, which serves as a basis for the priority of the present application.

Advantageous Effects of Invention

The method for controlling a pest according to the present invention is effective for various pests and can prevent the development or proliferation of the pests. The method for controlling a pest that can be provided by the present invention is highly safe and convenient and has few environmental loads.

The pest control apparatus of the present invention can provide an apparatus having conditions necessary for carrying out the method for controlling a pest according to the present invention.

DESCRIPTION OF EMBODIMENTS

Figure 1:
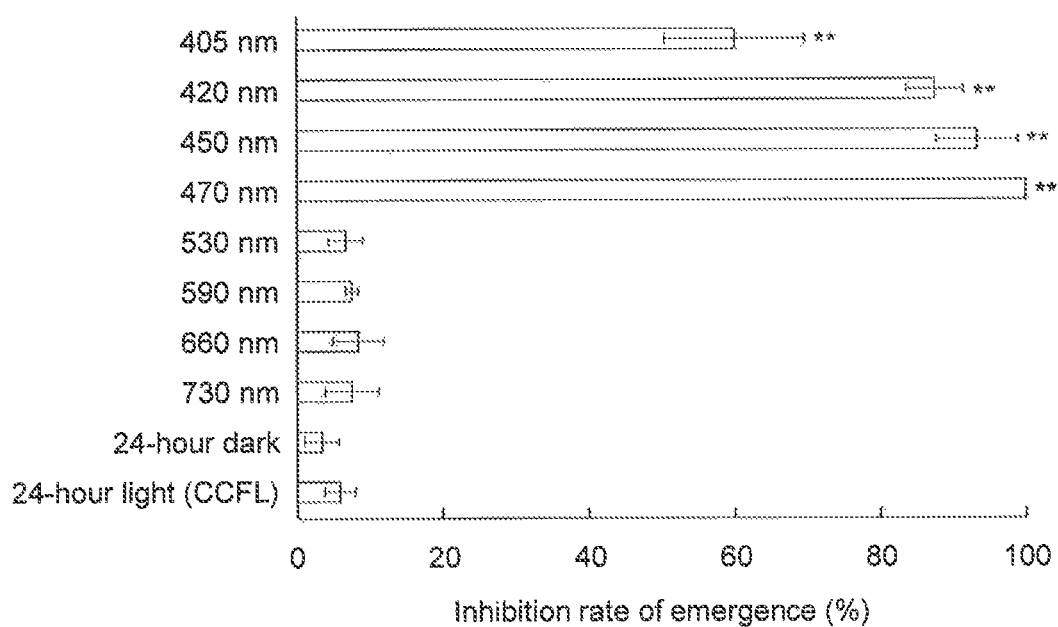
FIG. 1 is a diagram showing results about the inhibition rate of emergence (the death rate of pupae) when pupae of *Drosophila lutescens* were irradiated with light of each wavelength described. The light intensity is $2\times10^{18}$ photons·m$^{-2}$·s$^{-1}$ for 420 nm and $3\times10^{18}$ photons·m$^{-2}$·s$^{-1}$ for the other wavelengths. In the diagram, * represents $p<0.05$, and  represents $p<0.01$ (Dunnett's test vs. the 24-hour dark condition). The same holds true for other diagrams (except for FIGS. 8, 9, and 12** in which the Dunnett's test was conducted vs. the 16L:8D photoperiod condition using a white cold cathode fluorescent lamp).

1. Method for Controlling Pest 1-1. Summary

The first aspect of the present invention provides a method for controlling a pest. The method for controlling a pest according to the present invention comprises irradiating the target pest with light of a specific wavelength in a visible light region at predetermined light intensity to inhibit metamorphosis thereof, whereby the target pest is killed and development and proliferation thereof are prevented.

The method for controlling a pest according to the present invention employs irradiation with visible light and therefore has the advantages that the method is free from environmental loads such as environmental pollutions caused by residues, is carried out by convenient procedures, and is highly safe to humans and livestock.

1-2. Definition

Each term used in the present specification will be defined below.

The "pest" is an organism of the phylum Arthropoda that has harmful influence on humans, livestock, pet animals, laboratory animals, or properties. The pest mainly corresponds to an organism belonging to the class Insecta or the class Arachnida. For example, agricultural pests having harmful influence on the fields of agriculture, forestry, and landscape architecture, stored product pests having harmful influence on stored foods, hygiene pests (including livestock pests and unpleasant pests) having harmful influence on the hygiene of humans and animals such as livestock, and property pests having harmful influence on properties or cultural assets such as houses, clothes, and books are known as pests, all of which are included in the pest of the present invention. For example, an insect belonging to the order Diptera as a hygiene pest or an agricultural pest, an insect belonging to the order Coleoptera as an agricultural pest, a stored product pest, or a property pest, an insect belonging to the order Lepidoptera as an agricultural pest, a stored product pest, or a property pest, an insect belonging to the order Thysanoptera as an agricultural pest, an insect belonging to the order Hemiptera as an agricultural pest or a hygiene pest, an insect belonging to the order Orthoptera as an agricultural pest, an insect belonging to the order Blattodea as a hygiene pest or a property pest, an insect belonging to the order Siphonaptera as a hygiene pest, an insect belonging to the order Psocodea as a hygiene pest or a property pest, or an animal belonging to the order Acari as a hygiene pest or an agricultural pest can be the target pest of the present invention. Specifically, examples of the insect belonging to the order Diptera include species belonging to the superfamily Ephydroidea (including species belonging to the family Drosophilidae), species belonging to the superfamily Tephritoidea, species belonging to the superfamily Muscoidea, species belonging to the superfamily Oestroidea, species belonging to the superfamily Opomyzoidea (including species belonging to the family Agromyzidae), species belonging to the superfamily Sciaroidea, species belonging to the superfamily Tabanoidea, species belonging to the family Psychodidae, and species belonging to the superfamily Culicoidea (including species belonging to the family Culicidae). Examples of the insect belonging to the order Coleoptera include species belonging to the family Tenebrionidae, species belonging to the family Trogossitidae, species belonging to the family Chrysomelidae, species belonging to the family Anobiidae, and species belonging to the family Dryophthoridae. Examples of the insect belonging to the order Lepidoptera include species belonging to the superfamily Bombycoidea, species belonging to the superfamily Pyraloidea, species belonging to the superfamily Noctuoidea, species belonging to the superfamily Geometroidea, and species belonging to the superfamily Sphingoidea. Examples of the insect belonging to the order Hemiptera include species belonging to the superfamily Pentatomoidea, species belonging to the superfamily Aphidoidea, species belonging to the superfamily Coccoidea, species belonging to the superfamily Psylloidea, species belonging to the superfamily Ale species belonging to the superfamily Tingoidea, and species belonging to the superfamily Fulgoroidea. Examples of the insect belonging to the order Psocodea include species belonging to the suborder Anoplura, species belonging to the suborder Troctomorpha, and species belonging to the suborder Trogiomorpha. Examples of the animal belonging to the order Acari include species belonging to the family Tetranychidae, and species belonging to the family Acaridae.

The "target pest" refers to a pest to be controlled by the method for controlling a pest according to the present invention or the pest control apparatus according to the second aspect of the present invention mentioned later.

The "control" refers to the extermination of the pest to prevent harm thereof. The control used in the present specification is also meant to include (insect) pest killing that brings death to the pest.

The "metamorphosis" refers to large change in morphology or size during the course in which the pest grows. Specifically, the metamorphosis corresponds to conversion from eggs to larvae (hatching), molting at a larval stage, conversion of hemimetabolous insects from larvae to adults (emergence), and conversion of holometabolous insects from larvae to pupae (pupation) and from pupae to adults (emergence).

The term "inhibit metamorphosis" or "inhibition of metamorphosis" refers to the prevention of normal metamorphosis from occurring at an appropriate time. The pest whose metamorphosis has been inhibited no longer develops so that its physiological functions get out of order in many cases, eventually leading to death. Examples of the inhibited metamorphosis include a state in which an egg cannot hatch and eventually die, a state in which a larva cannot molt and is no longer able to grow from the instar (including eventual death), a state in which molting ends in failure, leading to death in the course of molting, a state in which a pest gets out of order after molting and dies, a state in which a pest dies as a prepupa without pupating, a state in which pupation ends in failure, leading to death in the course of pupation, a state in which a pest gets out of order after pupation and dies as a pupa, a state in which emergence ends in failure, leading to death in the course of emergence, and a state in which a pest gets out of order early after emergence (e.g., in a cocoon or in a pupal chamber) and dies without starting reproductive activity. The inhibitory effect on the metamorphosis may be exerted at any stage of development at or subsequent to the stage of development where the pest is irradiated with light of a specific wavelength mentioned later. For example, the metamorphosis inhibitory effect when an egg is irradiated with light of a specific wavelength may appear not only as the inhibition of hatching hut as the inhibition of pupation. The metamorphosis inhibitory effect is also effective for suppressing the propagation of the pest because the pest cannot grow into an adult having fertility or dies before starting reproductive activity even if growing into an adult.

The "visible light" is an electromagnetic wave having a wavelength that can be recognized as light by human eyes. The visible light usually corresponds to a wavelength region of 380 nm (purple light) to 750 nm (red light).

In the present specification, the "light intensity" refers to the total number of photons Contained in surface irradiated with light of a specific wavelength. For example, the light intensity of light having a wavelength of 460 nm is the integral of the numbers of photons for wavelengths within a range of 15 nm plus to minus the peak (460 nm) of a wavelength spectrum as mentioned later (460±15 nm). In the present specification, the light intensity is indicated by the number of photons per unit area per unit time (photons·m$^{-2}$·s$^{-1}$), i.e., a value obtained by dividing the total number of photons contained in irradiated surface by a numeric value obtained by the multiplication of irradiation area (m$^2$) and irradiation time (sec). The number of photons can be determined by actually measuring light on irradiated surface using a spectrometer or the like. The light intensity described in the present specification is based on a value measured using a high-resolution spectrometer HSU-100S manufactured by Asahi Spectra Co., Ltd. according to the method described in the instruction manual.

1-3. Method

The method for controlling a pest according to the present invention comprises an irradiation step.

The "irradiation step" is the step of irradiating an egg, a larva, or a pupa of the target pest with light of a specific wavelength at predetermined light intensity.

The "light of a specific wavelength" refers to visible light of a short wavelength region (short-wavelength visible light) having a peak of a wavelength spectrum in a wavelength region of 400 to 500 nm, preferably 400 to 480 nm, more preferably 405 to 475 nm. Thus, in the present specification, for example, the term "light having a wavelength of 460 nm" means visible light of a short wavelength region having a peak of wavelength spectrum at 460 nm. Usually, the light of a specific wavelength also includes light within a range of 15 nm plus to minus the wavelength peak (in the example mentioned above, light having a wavelength of 460±15 nm). The light of a specific wavelength may be monochromatic light having one wavelength peak within the wavelength region, or complex light having a plurality of wavelength peaks within the wavelength region.

The "irradiation with light of a specific wavelength" refers to irradiation with light having a wavelength peak in the wavelength region of 400 to 500 nm. Even if the light has no wavelength peak, irradiation with transmitted light selected as light having a wavelength of 400 to 500 nm through a wavelength selective filter is included in the scope of the present invention.

The "predetermined light intensity" is a light intensity of $7\times10^{17}$ photons·m$^{-2}$·s$^{-1}$ or larger, preferably $8\times10^{17}$ photons·m$^{-2}$·s$^{-1}$ or larger, more preferably $9\times10^{17}$ photons·m$^{-2}$·s$^{-1}$ or larger, further preferably $1\times10^{18}$ photons·m$^{-2}$·s$^{-1}$ or larger, particularly preferably $2\times10^{18}$ photons·m$^{-2}$·s$^{-1}$ or larger. In general, a pest, such as a hygiene pest, a stored product pest, or a property pest, which lives in a relatively dark environment that is not directly exposed to sunlight is low resistant to light. Therefore, a light intensity of $7\times10^{17}$ photons·m$^{-2}$·s$^{-1}$ or larger or $8\times10^{17}$ photons·m$^{-2}$·s$^{-1}$ or larger suffices. A light intensity of $1\times10^{18}$ photons·m$^{-2}$·s$^{-1}$ or $2\times10^{18}$ photons·m$^{-2}$·s$^{-1}$ or larger is more preferred. When the pest that lives in a dark environment is a pest, such as a mosquito, whose egg, larva, or pupa lives in water, the light intensity is preferably $1.0\times10^{19}$ photons·m$^{-2}$·s$^{-1}$ or larger, and a light intensity of $1.5\times10^{19}$ photons·m$^{-2}$·s$^{-1}$ or larger is more effective. In this case, light of a specific wavelength set to a wavelength of 400 to 430 nm highly permeable to water is further effectively used at the same time therewith. On the other hand, a pest, such as an agricultural pest, which lives in a bright environment that is directly exposed to sunlight, is highly resistant to light. Therefore, a light intensity of $1.5\times10^{19}$ photons·m$^{-2}$·s$^{-1}$ or larger, preferably $2.0\times10^{19}$ photons·m$^{-2}$·s$^{-1}$ or larger, is more effective. The upper limit of the light intensity is not particularly limited, and a light intensity of $1.0\times10^{20}$ photons·m$^{-2}$·s$^{-1}$ or smaller, preferably $5\cdot10^{19}$ photons·m$^{-2}$·s$^{-1}$ or smaller, usually suffices.

This step can be achieved by merely irradiating an egg, a larva, or a pupa of the target pest with light of a specific wavelength at predetermined light intensity. In addition to the light of a specific wavelength, the target pest may be irradiated with light of an additional wavelength at the same time therewith, as mentioned later.

The irradiation is preferably continuous irradiation and may be irradiation with pulse light or intermittent irradiation as long as the irradiation time that produces the light intensity described above is maintained. This can be expected to save energy.

The irradiation method is not particularly limited as long as the method exposes the target pest to the light of a specific wavelength. A method capable of directly irradiating the target pest with the light of a specific wavelength is preferred. For example, a pest, such as a leaf-miner fly, which damages the inside of leaves by feeding, or a pest, such as a mosquito, whose egg, larva, or pupa grows in water, cannot be directly irradiated. Such a pest may be irradiated indirectly through the epidermis of leaves or through water. In this case, the light used in the irradiation might be attenuated. Therefore, the light intensity may be increased, according to the need, in order to obtain a high control effect.

The irradiation site is a source in which an egg, a larva, and/or a pupa of the target pest lives. Such a source can be irradiated with the light of a specific wavelength. For producing a high effect, usually, direct irradiation of a wide area of surface is preferred rather than spot irradiation which irradiates one spot. When the target pest is, for example, an aphid, an aphid population that sucks a plant stem or bud can be directly irradiated in all directions. When the target pest is a mosquito, a puddle of a source containing mosquito larvae or pupae can be irradiated from the surface of water. When the target pest is *Tribolium castaneum*, wheat flour, which is a source, can be spread and entirely irradiated.

The stage of development of the pest to be irradiated with the light of a specific wavelength is any of an egg stage, a larval stage, and a pupal stage. This is because the present invention has the effect of inhibiting the metamorphosis of the pest. Thus, the present invention has no direct effect on adult that have completed the whole course of metamorphosis. The stage of development particularly effective for the irradiation is a pupal stage, though the stage of development is not limited to this stage, as a matter of course.

1-4. Effect

The method for controlling a pest according to the present invention can exert effects by merely irradiating the target pest with short-wavelength visible light. Therefore, the method for controlling a pest according to the present invention is convenient, can be carried out with a relatively inexpensive apparatus or facility, is highly safe, and also has very small environmental loads. Hence, the method for controlling a pest according to the present invention can be carried out in farm fields, food factories, and public facilities, etc. as well as ordinary households.

The method for controlling a pest according to the present invention can be applied to various pests including agricultural pests, hygiene pests, and property pests, regardless of whether to be diurnal or nocturnal.

2. Pest Control Apparatus 2-1. Summary

The second aspect of the present invention provides a pest control apparatus. The pest control apparatus of the present invention is an apparatus capable of irradiating the target pest with predetermined light of a specific wavelength at predetermined light intensity by use of the method for controlling a pest according to the first aspect.

Use of the pest control apparatus of the present invention allows the target pest to be irradiated with light of a specific wavelength under appropriate conditions. Thus, the method for controlling a pest according to the first aspect can be easily carried out.

2-2. Configuration

The pest control apparatus of the present invention comprises a light source for pest control as an essential component and comprises a light intensity-adjusting unit and a light intensity controller, a wavelength controller, a wavelength selective filter, a switch, a cell, and an additional light source as optional components. Hereinafter, each component will be specifically described.

(1) Light Source for Pest Control

The light source for pest control is an essential component in the pest control apparatus of the present invention and is configured to be capable of emitting specific short-wavelength visible light in a wavelength region of 400 to 500 nm. For example, a light emitting diode (hereinafter, also referred to as "LED" in the present specification) can be designed to have a peak in the desired wavelength spectrum and is therefore preferred as the light source for pest control of the present invention. In the case of using a mercury lamp, a metal halide lamp, or a fluorescent lamp as the light source for pest control, a wavelength selective filter mentioned later is required.

In the apparatus of the present invention, the placement of the light source for pest control is not particularly limited as long as the placement allows the target pest to be irradiated with the light of a specific wavelength. The placement may be placement in which the target pest can be directly irradiated from the light source for pest control, or placement that offers indirect irradiation via a reflective plate, or a combination thereof. Placement that offers direct irradiation or placement in which direct irradiation and indirect irradiation are combined, as in a flashlight, is preferred. The number of the light source for pest control installed in the apparatus of the present invention is not limited. Preferably, the apparatus of the present invention has one or more light sources for pest control for uniformly irradiating a wide area with the light of a specific wavelength. When the apparatus has a plurality of light sources for pest control, these light sources may be centralized. Preferably, these light sources are placed to cover a two-dimensionally broad region for uniformly irradiating a wide area. When the apparatus has a plurality of light sources for pest control, these light sources may have the same or different wavelength peaks. For example, the apparatus may have a plurality of LEDs having a wavelength peak only at 420 nm or may have LED having a wavelength peak at 420 nm and a LED having a wavelength peak at 460 nm in combination.

(2) Light Intensity-Adjusting Unit and Light Intensity Controller

The "light intensity-adjusting unit" is an optional component in the pest control apparatus of the present invention and is a unit that adjusts the light of a specific wavelength emitted from the light source for pest control to a light intensity of $7 \times 10^{17}$ photons·m$^{-2}$·s$^{-1}$ or larger, preferably $8 \times 10^{17}$ photons·m$^{-2}$·s$^{-1}$ or larger, more preferably $9 \times 10^{17}$ photons·m$^{-2}$·s$^{-1}$ or larger, further preferably $1 \times 10^{18}$ photons·m$^{-2}$·s$^{-1}$ or larger, for the target pest.

The "light intensity controller" is an optional component in the pest control apparatus of the present invention and is a device included in the light intensity-adjusting unit. The light intensity controller can control light irradiation conditions such that the light to irradiate the target pest has an arbitrary value of $7 \times 10^{17}$ photons·m$^{-2}$·s$^{-1}$ or larger, preferably $8 \times 10^{17}$ photons·m$^{-2}$·s$^{-1}$ or larger, more preferably $9 \times 10^{17}$ photons·m$^{-2}$·s$^{-1}$ or larger, further preferably $1 \times 10^{18}$ photons·m$^{-2}$·s$^{-1}$ or larger, in terms of light intensity. Preferably, the light intensity controller controls the light within a range of $7 \times 10^{17}$ to $1 \times 10^{20}$ photons·m$^{-2}$·s$^{-1}$. Since the light intensity can be arbitrarily controlled by the light intensity controller, the target pest can be irradiated with light of a specific wavelength at light intensity most effective for the type of the target pest.

(3) Wavelength Controller

The "wavelength controller" is an optional component in the pest control apparatus of the present invention and is a device that can arbitrarily control the light of a specific wavelength within a wavelength range of 400 to 500 nm, in this context, the term "arbitrarily control" means that the wavelength is shifted at multiple stages or continuously within the range of 400 to 500 nm. The wavelength control mechanism of the wavelength controller is not particularly limited. In the case of, for example, placing a plurality of LEDs having a wavelength peak in a wavelength range of 400 to 500 nm in the apparatus and irradiating the target pest with light having a wavelength of 460 nm, only LED having a wavelength peak at 460 nm in the apparatus is turned on.

In the case of then shifting the light to light having a wavelength of 490 nm, the wavelength controller can be configured such that the LED of 460 nm can be turned off and LED having a wavelength peak at 490 nm placed in the apparatus can be turned on. In the case of using a mercury lamp, a metal halide lamp, or a fluorescent lamp as the light source for pest control, the pest control apparatus can be provided with a plurality of wavelength selective filters mentioned later. For irradiation with light having a wavelength of 460 nm, a wavelength selective filter that allows only light having a wavelength of approximately 460 nm to pass therethrough may be selected and placed in the light source for pest control. The pest control apparatus of the present invention equipped with both the wavelength controller and the light intensity controller can control the light of a specific wavelength and the light intensity more arbitrarily and more finely.

(4) Wavelength Selective Filter

The "wavelength selective filter" is an optional component in the pest control apparatus of the present invention and is a filter that allows only the light of a specific wavelength to pass therethrough and can cut off light of other wavelengths. By way of the wavelength selective filter, the target pest can be irradiated with only light within a range of, for example, 15 nm plus to minus a peak in a wavelength spectrum, while light of other wavelengths can be removed. The wavelength selective filter is usually placed between the light source for pest control and the target pest in the apparatus. Thus, the target pest is irradiated through the wavelength selective filter with the light emitted from the light source for pest control in the apparatus of the present invention. Instead of placing the wavelength selective filter in the apparatus, the light source for pest control itself may be covered with the wavelength selective filter. For example, a fluorescent lamp coated with the wavelength selective filter may be used as a fluorescent lamp to irradiate the target pest with only the desired light of a specific wavelength.

The apparatus can have one or more wavelength selective filters. When the apparatus has a plurality of wavelength selective filters, each wavelength selective filter preferably allows light of a distinctive wavelength to pass therethrough.

In the case of using a light source, such as a mercury lamp, a metal halide lamp, or a fluorescent lamp, which emits light having no peak in a specific wavelength spectrum, the wavelength selective filter is an essential component.

(5) Switch

The "switch" is an optional component in the pest control apparatus of the present invention and is a device that opens and closes an electrical circuit in the pest control apparatus of the present invention. The pest control apparatus is configured such that the power is applied with the electrical circuit closed by the switch (with the switch in the ON position) to emit light from the light source, while the power is interrupted with the electrical circuit opened (with the switch in the OFF position) to stop the light emission from the light source. One pest control apparatus may have two or more switches.

(6) Cell

The "cell" is an optional component in the pest control apparatus of the present invention and is a device that can generate power in itself. Chemical cells including primary cells, which are designed to be used once and discarded, and not recharged with electricity, and secondary cells and fuel cells, which can be reused and recharged with electricity, physical cells such as solar cells, and biological cells such as microbial fuel cells and oxygen cells are known. The cell of the present invention may be any of these cells. When the pest control apparatus is of human-carried type, a relatively small cell such as an alkaline dry cell, a lithium ion cell, a nickel-cadmium cell, or a small solar cell is preferred. The pest control apparatus of the present invention is configured such that the cell is replaceable.

(7) Additional Light Source

The "additional light source" is an optional component in the pest control apparatus of the present invention and is a light source capable of emitting light other than the specific wavelength region of visible light emitted from the light source for pest control, or light including all wavelength regions of visible light.

The "light source capable of emitting light other than the specific wavelength region of visible light" refers to a light source that can emit light other than the specific wavelength region of visible light. The specific wavelength region of visible light is a wavelength region of 400 to 500 nm. Thus, the light source capable of emitting light other than the specific wavelength region of visible light is not particularly limited as long as the light source is capable of emitting light in a wavelength region of 500 to 750 nm. As one example, a light source capable of emitting light with a wavelength spectrum that contributes to the photosynthesis of plants is preferred because use of the pest control apparatus of the present invention can promote the photosynthesis of plants. Light in a wavelength region of 600 to 750 nm and light with a wavelength spectrum in a wavelength region of 400 to 500 nm is usually effective for the photosynthesis of plants. Of them, the light in a wavelength region of 400 to 500 nm has the same wavelength region as that of the light source for pest control. Therefore, a light source that can emit light in a wavelength region of 600 to 750 nm is preferred as the light source capable of emitting light other than the specific wavelength region of visible light. A light source that can emit light in a wavelength region of 620 to 680 nm is more preferred. For example, LED having a wavelength peak in a wavelength region of 620 to 680 nm can be used.

The pest control apparatus of the present invention equipped with both the "additional light source" that emits light in this wavelength region and the light source for pest control can be installed in, for example, a house or a plant factory, and used to irradiate crops or the like, thereby promoting the photosynthesis of the crops or the like at the same time with pest control.

The "light source capable of emitting light including all wavelength regions of visible light" usually refers to, for example, an ordinary fluorescent lamp or white LED having intensity in which wavelengths over almost all visible light regions are not zero.

The apparatus of the present invention can comprise one or more additional light sources. These light sources may be light sources that emit light of the same wavelength or may be light sources that emit light of different wavelengths.

These light sources are used, not for controlling the target pest, but for promoting the photosynthesis of plants as mentioned above, or for making visual identification of the apparatus by a user, for example, for confirming the placement of the light source in the apparatus or the position of the target pest to be irradiated.

2-3. Effect

The pest control apparatus of the present invention can be placed in a desired location and thereby allows the target pest to be easily irradiated under appropriate conditions with light of a specific wavelength that attains the effects of the method for controlling a pest according to the first aspect. For example, the pest control apparatus of the present invention is placed on the backside of a lid of a garbage and can thereby control the development of flies. Also, the pest control apparatus of the present invention is placed in production processes of food raw materials or feed or a storage house, which might be contaminated with pests, and can thereby control the development or proliferation of the pests.

3. Light Source for Pest Control 3-1. Summary

The third aspect of the present invention provides a light source for pest control. The light source for pest control of the present invention can be used as the light source for pest control as an essential component in the pest control apparatus according to the second aspect.

3-2. Configuration

The basic configuration of the light source for pest control of the present invention is the same as the configuration of the light source for pest control in the pest control apparatus according to the second aspect. The light source for pest control is not particularly limited as long as the light source is configured to be capable of selectively emitting specific short-wavelength visible light in a wavelength region of 400 to 500 nm. For example, the light source itself, as in LED, may be a light source capable of emitting light of a wavelength having a peak in the desired wavelength spectrum. Alternatively, the light source may be a light source, such as a mercury lamp, a metal halide lamp, or a fluorescent lamp, coated with a wavelength selective filter that allows only the desired light of a specific wavelength to pass therethrough.

3-3. Effect

The light source for pest control of the present invention can be installed in the pest control apparatus according to the second aspect, thereby providing a pest control apparatus that attains the effects of the method for controlling a pest according to the first aspect.

Light sources eventually reach the end of their lives and usually suffer degradation in response to lighting time. Therefore, the light sources need to be replaced after a lapse of a given period. The light source for pest control installed in the pest control apparatus according to the second aspect is no exception. There is also the possibility that the light source for pest control is physically broken.

The light source for pest control can be used for replacement when the light source for pest control installed in the pest control apparatus has reached the end of its life or has been physically broken. If the other portions in the pest control apparatus still works, the pest control apparatus can be successively used by merely replacing the light source for pest control with the light source for pest control of the present invention without replacing the whole pest control apparatus. Thus, the light source for pest control of the present invention is economical and also reduces environmental loads.

EXAMPLES

Example 1: Emergence Inhibitory Effect of Short-Wavelength Visible Light on *Drosophila lutescens* Pupae (Objective)

An emergence inhibitory effect when pupae of *Drosophila lutescens* belonging to the family Drosophilidae (the superfamily Ephydroidea) of the order Diptera was irradiated with short-wavelength visible light was tested.

(Method)

30 pupae of *Drosophila lutescens* within 24 hours after pupation were put in each glass Petri dish, which was then placed in Bio Multi Incubator (LH-30CCFL-8CT, manufactured by NKsystem) equipped with LED lighting (IS-mini, manufactured by CCS Inc.) and set to 25±1° C., and irradiated with LED for 7 days. The wavelength of visible light used in the irradiation was set to 405, 420, 450, 470, 530, 590, 660, and 730 nm. The light intensity was $2\times10^{18}$ photons·m$^{-2}$·s$^{-1}$ for the light of 420 nm and $3\times10^{18}$ photons·m$^{-2}$·s$^{-1}$ for light of the other wavelengths. For controls, the experiment was conducted under a 24-hour light condition (24-hour light) using a white cold cathode fluorescent lamp (CCFL: $1\times10^{18}$ photons·m$^{-2}$·s$^{-1}$) and a 24-hour dark condition (24-hour dark). After the irradiation, the number of individuals that emerged was examined to evaluate the emergence inhibitory effect. Among the 30 pupae, pupae that failed to emerge were left for a few days in an ordinary rearing environment after the irradiation to confirm the absence of later emergence. The inhibition rate of emergence was calculated. The replication of each test was carried out 4 times.

For the light of 405, 420, and 470 nm, the emergence inhibitory effect was compared using decreased light intensity.

(Results)

Figure 2:
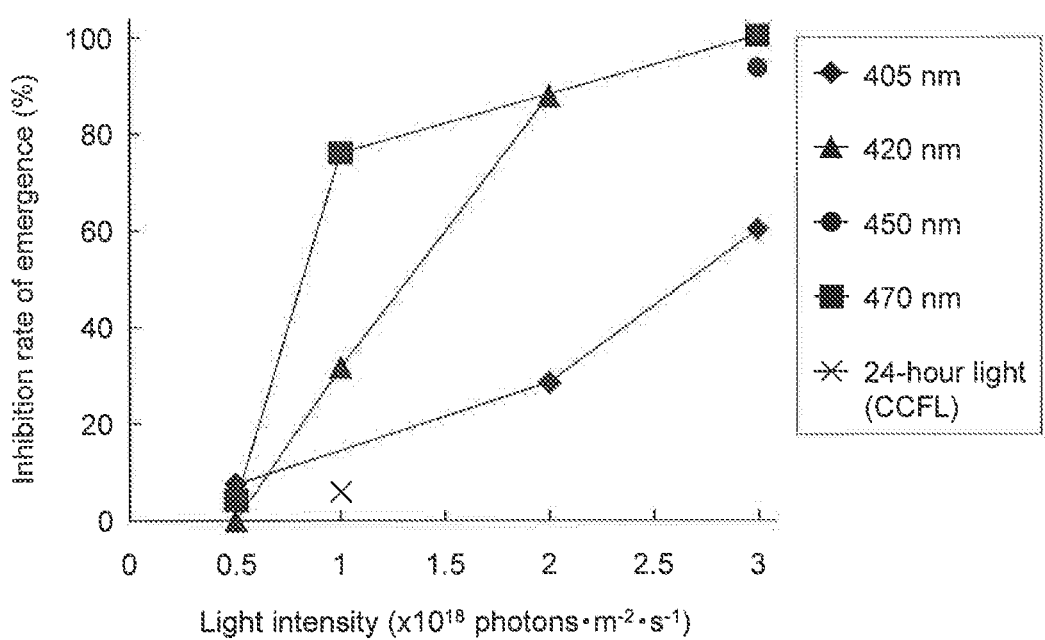
FIG. 2 shows the relationship between each light intensity and the inhibition rate of emergence when pupae of *Drosophila lutescens* were irradiated with light of each wavelength described.

FIG. 1 shows the inhibition rate of emergence by irradiation with light of each wavelength. FIG. 2 shows the relationship between the light intensity of light having a wavelength of 405, 420, 450, or 470 nm and the inhibition rate of emergence. Pupae whose emergence was inhibited were confirmed to eventually die without emerging as described above. Here, the inhibition rate of emergence therefore has the same meaning as the death rate of pupae.

As seen from FIG. 1, the irradiation with the light having a wavelength of 405 to 470 am exhibited a high inhibition rate of emergence for the *Drosophila lutescens* pupae. By contrast the irradiation with the light having a wavelength of 530 to 730 nm exhibited an inhibition rate of emergence equivalent to that of the 24-hour dark or the 24-hour light and was thus found to have no emergence inhibitory effect.

From FIG. 2, it became evident that the light having a wavelength of 405 to 470 nm exhibits an emergence inhibitory effect of 10% or more at any light intensity of $7\times10^{17}$ photons·m$^{-2}$·s$^{-1}$ or larger. Particularly, the light having a wavelength of 470 nm was very highly effective and exhibited a little under 40% inhibition rate of emergence at $7\times10^{17}$ photons·m$^{-2}$·s$^{-1}$, approximately 60% inhibition rate of emergence at $8\times10^{17}$ photons·m$^{-2}$·s$^{-1}$, and nearly 80% inhibition rate of emergence at $1\times10^{18}$ photons·m$^{-2}$·s$^{-1}$. Also, the light having a wavelength of 420 nm was relatively highly effective and exhibited 80% or more inhibition rate of emergence at $2\times10^{18}$ photons·m$^{-2}$·s$^{-1}$.

Example 2: Emergence Inhibitory Effect of Short-Wavelength Visible Light on *Drosophila melanogaster* Pupae (Objective)

A metamorphosis inhibitory effect when pupae of *Drosophila melanogaster* belonging to the family Drosophilidae (the superfamily Ephydroidea) of the order Diptera was irradiated with short-wavelength visible light was tested.

(Method)

The basic method followed Example 1 except that the wavelength of visible light used in the irradiation was set to 420, 435, 450, 470, 530, 590, 660, and 730 nm. For controls, a 16-hour light and 8-hour dark condition (16L:8D) was established in addition to the same 24-hour light and 24-hour dark as in Example 1. The light intensity was 1×, 2×, 3×, 4×, 5×, and 6×10$^{18}$ photons·m$^{-2}$·s$^{-1}$. The number of replication was 8 times.

Aside from the experiment described above, an emergence inhibitory effect by irradiation with light having a wavelength of 500 nm at one light intensity (6×10$^{18}$ photons·m$^{-2}$·s$^{-1}$) was tested.
(Results)

Figure 3:
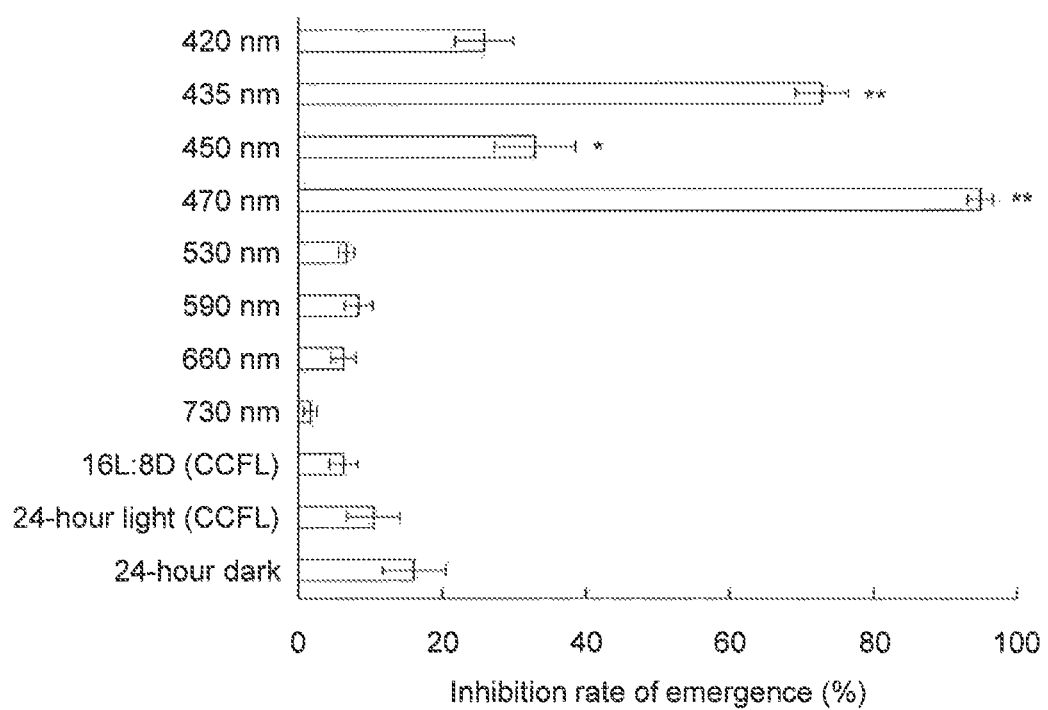
FIG. 3 is a diagram showing results about the inhibition rate of emergence (the death rate of pupae) when pupae of *Drosophila melanogaster* were irradiated with light of each wavelength described. The light intensity is $3\times10^{18}$ photons·m$^{-2}$·s$^{-1}$ for all wavelengths.
Figure 4:
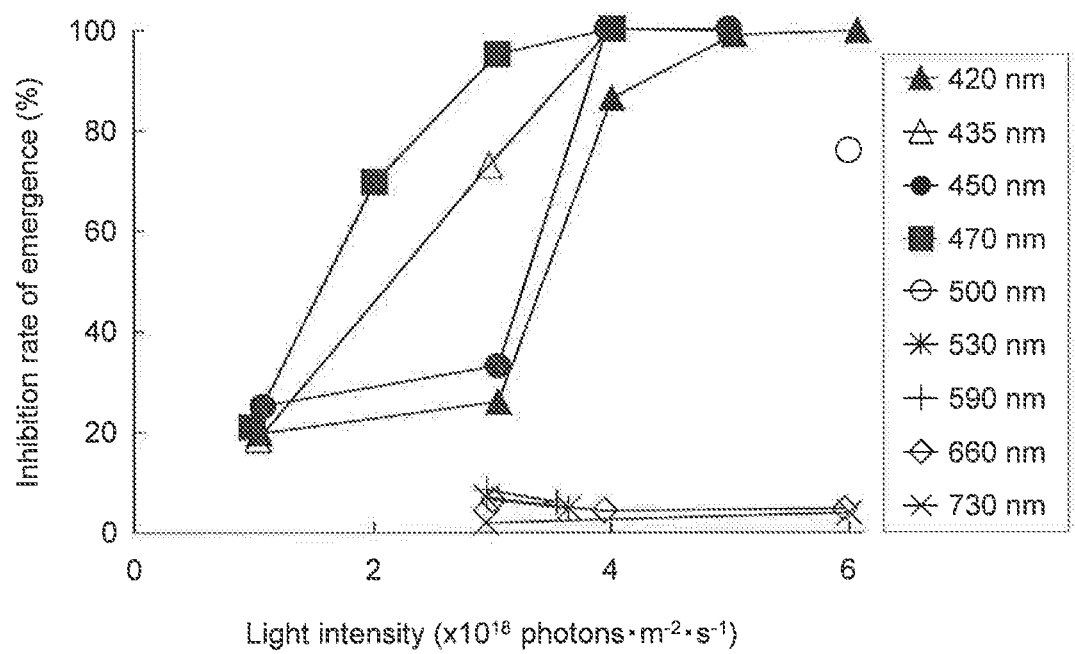
FIG. 4 is a diagram showing the relationship between each light intensity and the inhibition rate of emergence when pupae of *Drosophila melanogaster* were irradiated with light of each wavelength described.

FIG. 3 shows the results about the inhibition rate of emergence by irradiation with light of each wavelength at a light intensity of 3×10$^{18}$ photons·m$^{-2}$·s$^{-1}$. FIG. 4 shows the relationship between the light intensity of light of each wavelength and the inhibition rate of emergence. Here, the inhibition rate of emergence also has the same meaning as the death rate of pupae.

As seen from FIG. 3, the irradiation with the light having a wavelength of 420 to 470 nm exhibited an emergence inhibitory effect on the *Drosophila melanogaster* pupae. Particularly, the irradiation with the light having a wavelength of 435 to 470 nm exhibited a high emergence inhibitory effect. By contrast, the irradiation with the light having a wavelength of 530 to 730 nm exhibited an emergence inhibitory effect equivalent to or lower than that of the control 24-hour dark or 24-hour light, as in Example 1, and was thus found to have no emergence inhibitory effect.

From FIG. 4, it became evident that the light having a wavelength of 420 to 470 nm exhibits an emergence inhibitory effect of 20% or more at any light intensity of 1×10$^{18}$ photons·m$^{-2}$·s$^{-1}$ or larger and this effect is more prominent with increase in light intensity. The irradiation of the 500 nm light also exhibited 70% or more inhibition rate of emergence at 6×10$^{18}$ photons·m$^{-2}$·s$^{-1}$.

The results of this Example were substantially consistent with the results about the emergence inhibitory effect on *Drosophila lutescens* in Example 1 as a whole.

Example 3: Metamorphosis Inhibitory Effect of Short-Wavelength Visible Light on *Drosophila melanogaster* Larvae (Objective)

In Examples 1 and 2, the emergence inhibitory effect was tested. Accordingly, in this Example, the presence or absence of a metamorphosis inhibitory effect when *Drosophila melanogaster* larvae were irradiated with short-wavelength visible light was tested.
(Method)

10 last instar larvae of *Drosophila melanogaster* that crawled out of feed for pupation were put in each plastic Petri dish and irradiated with LED having light having a wavelength of 470 nn for 24 hours. The light intensity was set to 4 stages: 5×, 7×, 10×, and 12×10$^{18}$ photons·m$^{-2}$·s$^{-1}$. The difference in metamorphosis inhibitory effect depending on the intensity was also tested.

The irradiation method followed Example 1. After the irradiation, the plastic Petri dish was transferred into an insect rearing cage set to 25±1° C. and a 16-hour light and 8-hour dark condition (16L:8D; lighting for the light period employed a white fluorescent lamp). 7 days later, the number of individuals that emerged was counted. Typically, last instar larvae of fruit flies become prepupae approximately 24 hours after coming out of feed and emerge 4 to 5 days thereafter. Therefore, individuals that have not yet emerged even after a lapse of 7 days after irradiation can be determined as dead individuals whose metamorphosis has been inhibited. The dead individuals were recovered and dissected to confirm the stage of development at the time of death. The stage of development was classified into five stages: last instar larva, prepupal stage, early stage of pupae, late stage of pupae, and immediately before emergence. The replication was carried out 10 times.
(Results)

Figure 5:
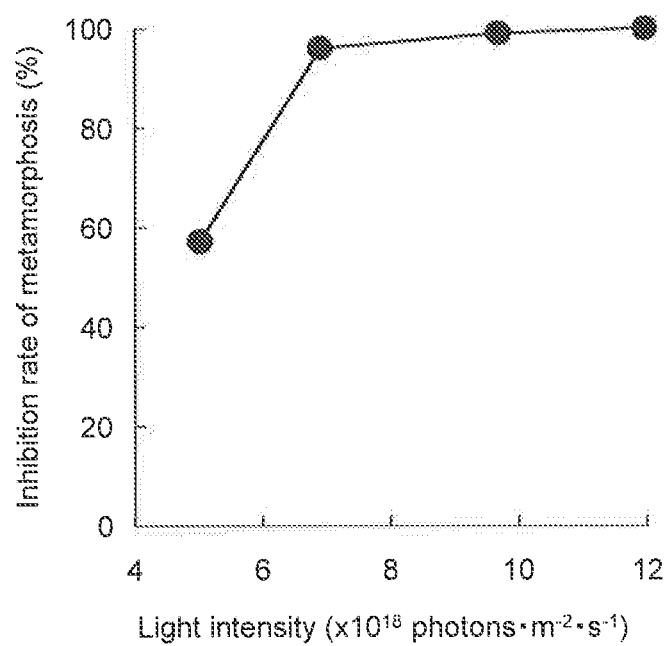
FIG. 5 is a diagram showing the relationship between each light intensity and the inhibition rate of metamorphosis (=the death rate of individuals) when last instar larvae of *Drosophila melanogaster* were irradiated with light having a wavelength of 470 nm.
Figure 6:
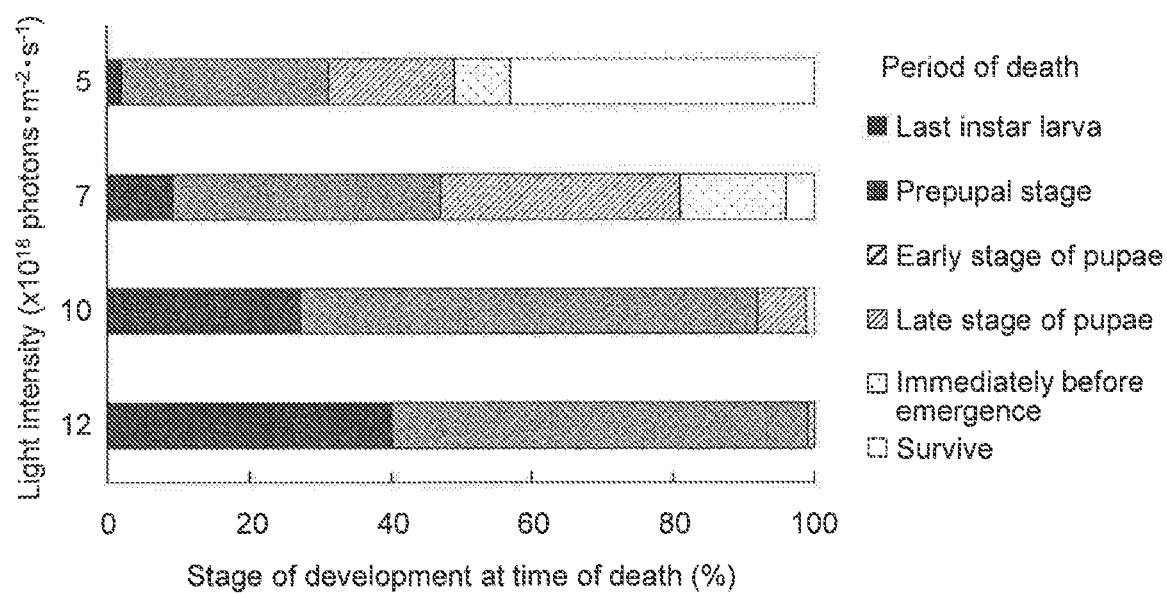
FIG. 6 is a diagram showing a stage of development at the time of death for each light intensity when last instar larvae of *Drosophila melanogaster* were irradiated with light having a wavelength of 470 nm.

FIG. 5 shows the relationship between the light intensity used in the irradiation and the death rate FIG. 6 shows the results about the stage of development at the time of death for each light intensity.

From the high death rate shown in FIG. 5, it became evident that the method for controlling a pest according to the present invention has a metamorphosis inhibitory effect not only on pupae but on larvae.

From FIG. 6, it was revealed that the stage of development at the time of death differs depending on the light intensity used in the irradiation and larger light intensity kills pests at an earlier stage of development.

Example 4: Emergence Inhibitory Effect of Short-Wavelength Visible Light on *Liriomyza huidobrensis* Pupae (Objective)

In order to confirm that the effects of the method for controlling a pest according to the present invention are not specific for the species belonging to the family Drosophilidae (the superfamily Ephydroidea) and the method for controlling a pest according to the present invention is also effective for other flies belonging to different families, *Liriomyza huidobrensis* belonging to the family Agromyzidae (the superfamily Opomyzoidea) of the order Diptera was used to test an emergence inhibitory effect when its pupae were irradiated with short-wavelength visible light.
(Method)

The basic method followed Example 1. 10 pupae of *Liriomyza huidobrensis* within 24 hours after pupation were put in each glass Petri dish and irradiated with LED light in the same way as in Example 1. The wavelength of visible light used in the irradiation was set to 405, 420, 435, 470, and 500 nm. The light intensity was 1.7×10$^{19}$ photons·m$^{-2}$·s$^{-1}$ for 405 nm, 2.0×10$^{19}$ photons·m$^{-2}$·s$^{-1}$ for 420 nm, 1.9×10 photons·m$^{-2}$·s$^{-1}$ for 435 nm, 1.8×10$^{19}$ photons·m$^{-2}$·s$^{-1}$ for 450 nm, 1.5×10$^{19}$ photons·m$^{-2}$·s$^{-1}$ for 470 nm, and 1.6×10$^{19}$ photons·m$^{-2}$·s$^{-1}$ for 500 nm. For controls, the same 1.6L:8D and 24-hour dark as in Example 2 were established. 15 days later, the number of individuals that emerged was examined to evaluate the emergence inhibitory effect. Pupae that failed to emerge were left for a few days in an ordinary rearing environment after the irradiation and then confirmed to die without emerging. The replication was carried out 12 times.
(Results)

Figure 7:
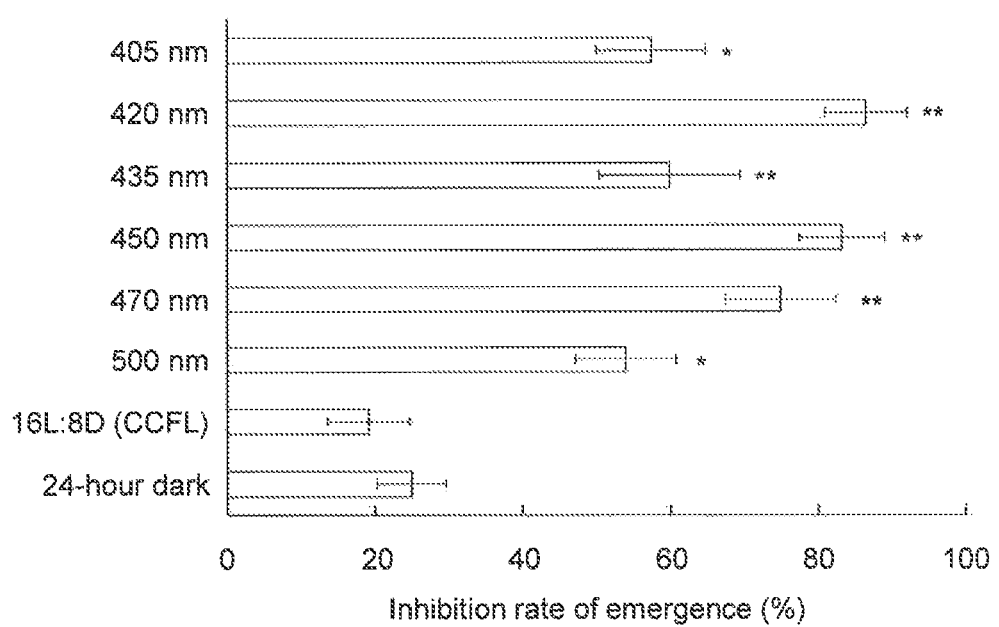
FIG. 7 is a diagram showing results about the inhibition rate of emergence (=the death rate of pupae) when pupae of *Liriomyza huidobrensis* were irradiated with light of each wavelength described. The light intensity is $1.7\times10^{19}$ photons·m$^{-2}$·s$^{-1}$ for 405 nm, $2.0\times10^{19}$ photons·m$^{-2}$·s$^{-1}$ for 420 nm, $1.9\times10^{19}$ photons·m$^{-2}$·s$^{-1}$ for 435 nm, $1.8\times10^{19}$ photons·m$^{-2}$·s$^{-1}$ for 450 nm, $1.5\times10^{19}$ photons·m$^{-2}$·s$^{-1}$ for 470 nm, and $1.6\times10^{19}$ photons·m$^{-2}$·s$^{-1}$ for 500 nm.

FIG. 7 shows the results about the inhibition rate of emergence by irradiation with light of each wavelength. Here, the inhibition rate of emergence also has the same meaning as the death rate of pupae.

From FIG. 7, it became evident that the light of all wavelengths tested has an emergence inhibitory effect. These results are analogous to the results of Example 1, demonstrating that the method for controlling a pest according to the present invention is effective not only for pupae of species belonging to the family Drosophilidae but for pupae of species belonging to other superfamilies of the order Diptera.

Example 5: Metamorphosis Inhibitory Effect of Short-Wavelength Visible Light on *Liriomyza huidobrensis* Eggs and Larvae (Objective)

*Liriomyza huidobrensis* was used to test a metamorphosis inhibitory effect when its eggs or larvae were irradiated with short-wavelength visible light.

(Method)

The basic method followed Example 3. Each *Phaseolus vulgaris* leaf with 10 eggs laid by *Liriomyza huidobrensis* was put in each glass Petri dish and irradiated with LED light for 22 consecutive days in the same way as in Example 4. The number of individuals that hatched and the number of individuals that pupated in the course thereof were examined. The wavelength of visible light used in the irradiation was set to 405 nm and 420 nm. The light intensity was $2.5\times10^{19}$ photons·m$^{-2}$·s$^{-1}$ for 405 nm and $2.7\times10^{19}$ photons·m$^{-2}$·s$^{-1}$ for 420 nm. For a control, the same 16L:8D as in Example 2 was established. The replication was carried out 12 times.

(Results)

Figure 8:
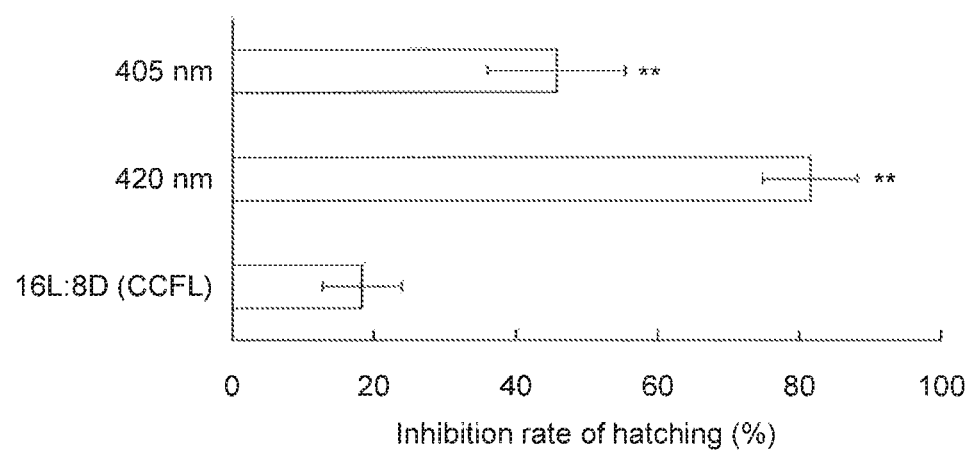
FIG. 8 is a diagram showing results about the inhibition rate of hatching (the death rate of eggs) when eggs of *Liriomyza huidobrensis* were irradiated with light of each wavelength described. The light intensity is $2.5 \times 10^{19}$ photons·m$^{-2}$·s$^{-1}$ for 405 nm and $2.7 \times 10^{19}$ photons·m$^{-2}$·s$^{-1}$ for 420 nm.
Figure 9:
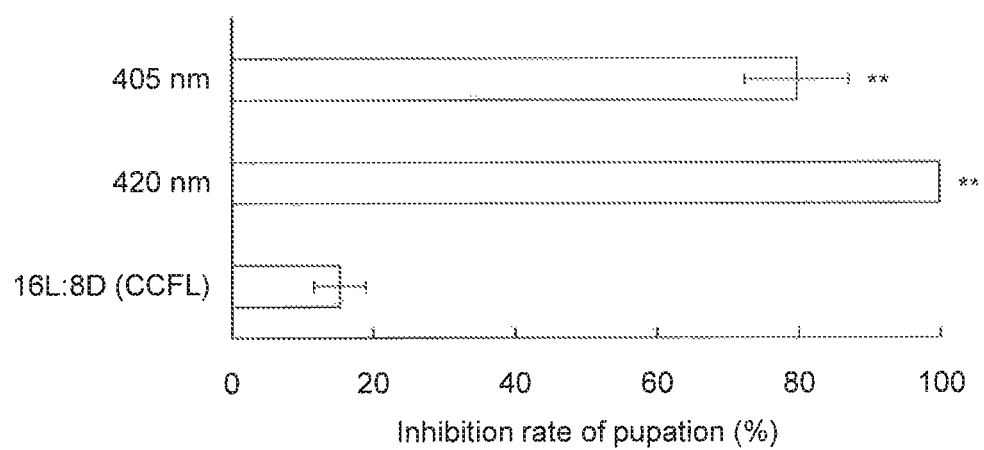
FIG. 9 is a diagram showing results about the inhibition rate of pupation (=the death rate of individuals) when last instar larvae of *Liriomyza huidobrensis* were irradiated with light of each wavelength described. The light intensity is $2.5 \times 10^{19}$ photons·m$^{-2}$·s$^{-1}$ for 405 nm and $2.7 \times 10^{19}$ photons·m$^{-2}$·s$^{-1}$ for 420 nm.

FIG. 8 shows the inhibition rate of hatching of eggs. FIG. 9 shows the inhibition rate of pupation of last instar larvae. As shown in FIGS. 8 and 9, the irradiation with the light having a wavelength of 405 or 420 nm was confirmed to have a metamorphosis inhibitory effect on both eggs and larvae. These results demonstrated that the method for controlling a pest according to the present invention also has not only an emergence inhibitory effect but metamorphosis inhibitory effects such as a hatching inhibitory effect and a pupation inhibitory effect on *Liriomyza huidobrensis*.

In this Example, the leaf surface was irradiated with the light of a specific wavelength. Since larvae of leaf-miner flies invade the inside of leaves of host plants, the target pest was irradiated via the epidermis of leaves with the light of a specific wavelength without being directly irradiated therewith. However, the method for controlling a pest according to the present invention proved to be able to exert its effects even by such indirect irradiation.

Example 6: Emergence Inhibitory Effect of Short-Wavelength Visible Light on Pupae of *Culex pipiens molestus* of Order Diptera (Objective)

*Culex pipiens molestus* was used to test whether the method for controlling a pest according to the present invention could exert similar effects on species belonging to the superfamily Culicoidea of the order Diptera (so-called mosquitoes).

(Method)

The basic method followed Example 1. 10 pupae of *Culex pipiens molestus* were put in each ice cream cup containing pure water and continuously irradiated with LED light in the same way as in Example 1 until each pupa emerged or died. The wavelength of visible light used in the irradiation was set to 405 nm and 420 nm. The light intensity was $1.0\times10^{19}$ and $1.5\times10^{19}$ photons·m$^{-2}$·s$^{-1}$ for both 405 nm and 420 nm. For controls, the same 24-hour dark, 24-hour light, and 16L:8D as in Example 2 were established. The replication was carried out 6 times.

(Results)

Figure 10:
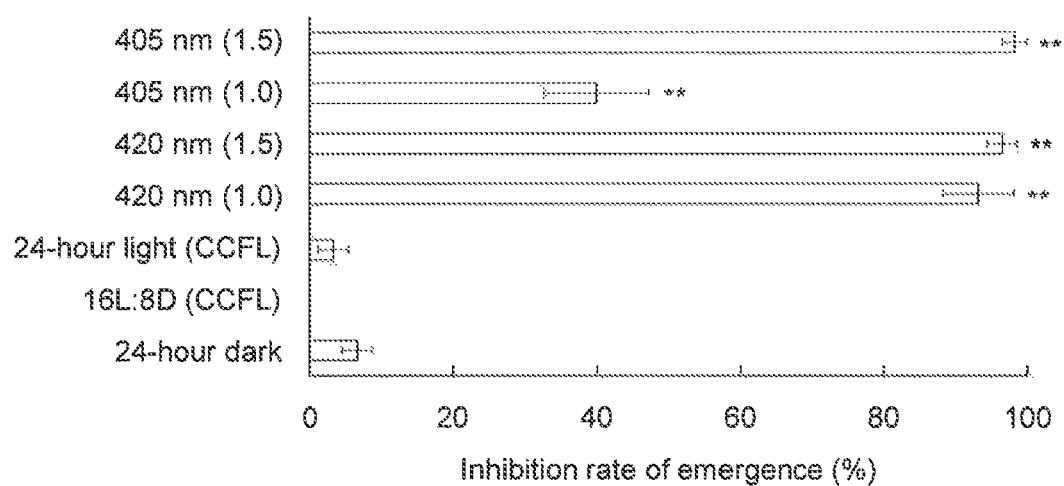
FIG. 10 is a diagram showing results about the inhibition rate of emergence (=the death rate of pupae) when pupae of *Culex pipiens molestus* were irradiated with light of each wavelength described. The light intensity is $1.0 \times 10^{19}$ photons·m$^{-2}$·s$^{-1}$ (in the diagram, indicated by "1.0") and $1.5 \times 10^{19}$ photons·m$^{-2}$·s$^{-1}$ (in the diagram, indicated by "1.5") for both 405 nm and 420 nm.

The results are shown in FIG. 10. The irradiation with the light having a wavelength of 405 or 420 nm was confirmed to have an emergence inhibitory effect. These results demonstrated that the method for controlling a pest according to the present invention has an emergence inhibitory effect not only on flies but on mosquitoes.

Example 7: Emergence Inhibitory Effect of Short-Wavelength Visible Light on *Tribolium confusum* Pupae (Objective)

The results of Examples 1 to 6 demonstrated that the method for controlling a pest according to the present invention can be effective for a wide range of species belonging to the order Diptera. Accordingly, in order to test the generality of the effects of the method for controlling a pest according to the present invention, whether to produce the same effects as found in Examples described above on a pest other than the order Diptera was tested.

(Method)

*Tribolium confusum* belonging to the family Tenebrionidae of the order Coleoptera was used as the target pest to test an emergence inhibitory effect when its pupae were irradiated with short-wavelength visible light.

The basic method followed Examples 1 and 2. 10 pupae of *Tribolium confusum* were put in each plastic Petri dish and irradiated for 14 days with LED having light having a wavelength of 405, 420, 470, or 530 nm. The light intensity was $2\times10^{18}$ photons·m$^{-2}$·s$^{-1}$ for all the wavelengths. For controls, the same 24-hour dark, 24-hour light, and 16L:8D as in Example 2 were established. The replication was carried out 4 times, (Results)

Figure 11:
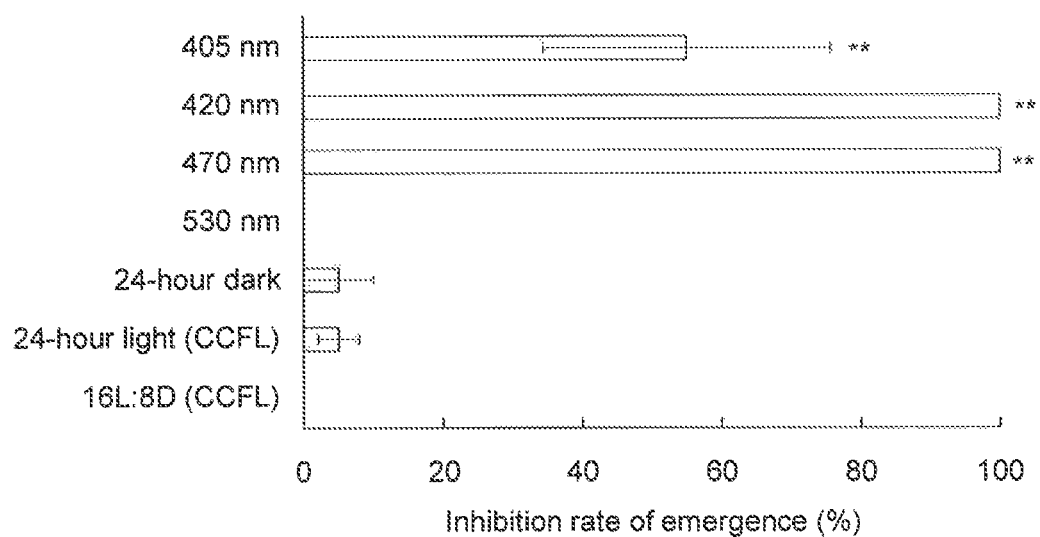
FIG. 11 is a diagram showing results about the inhibition rate of emergence (=the death rate of pupae) when pupae of *Tribolium confusum* were irradiated with light of each wavelength described. The light intensity is $2 \times 10^{18}$ photons·m$^{-2}$·s$^{-1}$ for all wavelengths.

The results are shown in FIG. 11. The irradiation with the light having a wavelength of 405, 420, or 470 nm was confirmed to have an emergence inhibitory effect, whereas the irradiation with the light having a wavelength of 530 nm exhibits no such effect. These results are not contradictory to the results of Examples 1 and 2. These results demonstrated that the method for controlling a pest according to the present invention has a metamorphosis inhibitory effect not only on pests of the order Diptera but on pests of the order Coleoptera.

Example 8: Hatching Inhibitory Effect on *Bombyx mori* Eggs (Objective)

The results of Example 7 demonstrated that the method for controlling a pest according to the present invention is effective even for pests other than the order Diptera, and supported the generality of the effects of the method for controlling a pest according to the present invention. Accordingly, in this Example, in order to render this generality more reliable, whether the method for controlling a pest according to the present invention could similarly exert a metamorphosis inhibitory effect on species belonging to the order Lepidoptera was tested.

(Method)

*Bombyx mori* was used as an insect of the order Lepidoptera. The basic method followed Examples 1 and 5. 10 eggs of *Bombyx mori* were put in each glass Petri dish and irradiated for 7 days with LED having light having a wavelength of 405, 420, 450, 470, 530, 590, or 735 nm. The light intensity was $1.7\times10^{19}$ photons·m$^{-2}$·s$^{-1}$ for 405 nm, $2.8\times10^{19}$ photons·m$^{-2}$·S$^{-1}$ for 420 nm, $2.0\times10^{19}$ photons·m$^{-2}$·s$^{-1}$ for 450 nm, $7.0\times10^{18}$ photons·m$^{-2}$·s$^{-1}$ for 470 nm, $4.0\times10^{18}$ photons·m$^{2}$·s$^{-1}$ for 530 nm, $4.0\times10^{18}$ photons·m$^{-2}$·s$^{-1}$ for 590 nm, and $1.7\times10^{19}$ photons·m$^{-2}$·s$^{-1}$ for 735 nm. For a control, the same 16L:8D as in Example 2 was established. The replication was carried out 5 times. After the irradiation, the number of individuals that hatched was examined to evaluate the hatching inhibitory effect. Eggs that failed to hatch were left for a few days in an ordinary rearing environment after the irradiation and confirmed to die without hatching.

(Results)

Figure 12:
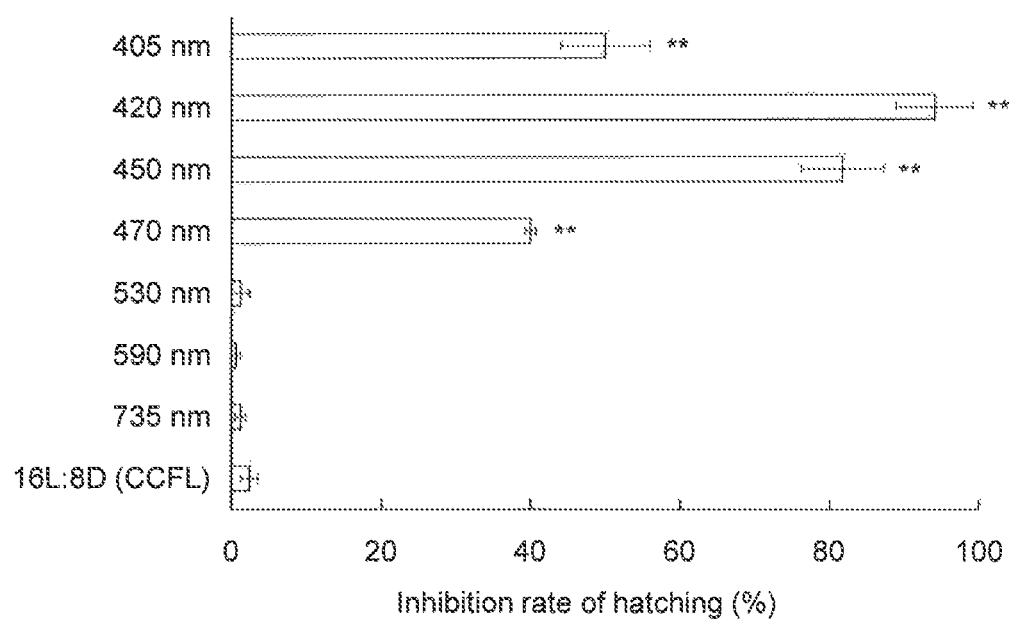
FIG. 12 is a diagram showing results about the inhibition rate of hatching (=the death rate of eggs) when eggs of *Bombyx mori* were irradiated with light of each wavelength described. The light intensity is $1.7 \times 10^{19}$ photons·m$^{-2}$·s$^{-1}$ for 405 nm, $2.8 \times 10^{19}$ photons·m$^{-2}$·s$^{-1}$ for 420 nm, $2.0 \times 10^{19}$ photons·m$^{-2}$·s$^{-1}$ for 450 nm, $7.0 \times 10^{18}$ photons·m$^{-2}$·s$^{-1}$ for 470 nm, $4.0 \times 10^{18}$ photons·m$^{-2}$·s$^{-1}$ for 530 nm, $4.0 \times 10^{18}$ photons·m$^{-2}$·s$^{-1}$ for 590 nm, and $1.7 \times 10^{19}$ photons·m$^{2}$·s$^{-1}$ for 735 nm.

The results are shown in FIG. 12. The irradiation with the light of all wavelengths tested from 405 to 470 nm was confirmed to have a hatching inhibitory effect. By contrast, the irradiation with the light having a wavelength of 530 nm or more exhibited no such effect. These results are not contradictory to the results of Examples described above. The results of this Example demonstrated the generality of the metamorphosis inhibitory effect of the method for controlling a pest according to the present invention.

All publications, patents, and patent applications cited herein are incorporated herein by reference in their entirety.

The invention claimed is:

1. A method for controlling a pest, comprising irradiating an egg, a larva, or a pupa of the pest with light of a specific wavelength in a wavelength region of $7 \times 10^{17}$ photons·$m^{-2} \cdot s^{-1}$ or larger to inhibit metamorphosis thereof.

2. The method for controlling a pest according to claim 1, wherein the pest is a hygiene pest, an agricultural pest, or a stored product pest.

3. The method for controlling a pest according to claim 2, wherein the pest is an insect.

4. The method for controlling a pest according to claim 3, wherein the pest is a species belonging to the order Diptera, the order Coleoptera, or the order Lepidoptera.

* * * * *